United States Patent [19]

Matsuda

[11] Patent Number: 5,307,401
[45] Date of Patent: Apr. 26, 1994

[54] CELLULAR TELEPHONE WITH MICROPHONE EXTENDER

[75] Inventor: Hari Matsuda, Evanston, Ill.

[73] Assignee: Mitsubishi International Corporation, Wood Dale, Ill.

[21] Appl. No.: 24,095

[22] Filed: Feb. 26, 1993

Related U.S. Application Data

[63] Continuation of Ser. No. 661,388, Feb. 26, 1991.

[51] Int. Cl.⁵ .......................................... H04M 11/00
[52] U.S. Cl. ................................. 379/59; 379/433; 379/440; D14/138; 455/90
[58] Field of Search ...................... 379/58, 59, 61, 433, 379/434, 440, 451, 452, 453, 457; 455/89, 90; 425/DIG. 44, DIG. 56; D14/138, 143; D21/111

[56] References Cited

U.S. PATENT DOCUMENTS

| | | |
|---|---|---|
| D. 277,164 | 1/1985 | Bevilacqua . |
| D. 286,877 | 11/1986 | Powell . |
| D. 295,411 | 4/1988 | Cho et al. . |
| D. 297,735 | 9/1988 | Soren et al. . |
| D. 299,136 | 12/1988 | Taylor ........................ D14/138 |
| D. 300,429 | 3/1989 | Watanabe . |
| D. 302,693 | 8/1989 | Le Bleu ....................... D14/143 |
| D. 303,387 | 9/1989 | Le Bleu ....................... D14/143 |
| D. 305,889 | 2/1990 | Plunkett et al. ............. D14/143 |
| 3,557,322 | 1/1971 | Walden . |
| 4,320,262 | 3/1982 | Read . |
| 4,736,418 | 4/1988 | Steadman .................... 379/451 |
| 4,912,759 | 3/1990 | Clark . |
| 4,926,474 | 5/1990 | Marks . |
| 5,012,513 | 4/1991 | Dale et al. ................... 379/440 |
| 5,109,539 | 4/1992 | Inubushi et al. ............. 379/433 |
| 5,151,946 | 9/1992 | Martensson .................. 379/433 |
| 5,197,091 | 3/1993 | Takagi et al. ................. 379/433 |

FOREIGN PATENT DOCUMENTS

| | | |
|---|---|---|
| 0445808 | 9/1991 | European Pat. Off. ........... 455/89 |
| 3516290 | 11/1986 | Fed. Rep. of Germany ....... 379/440 |
| 0160733 | 8/1985 | Japan ................................. 455/89 |

OTHER PUBLICATIONS

Mobile Office advertisement, Mitsubishi International Corporation "Speak With Authority", copyright 1990 (Jan. 1, 1990) Mitsubishi model 3000.

Mitsubishi International Corporation brochure: "Model 3000 Portable Cellular Telephone", 1991.

The Washington Post, Washington Business advertisement, Pal Cellular's telephone, "Introducing Power Fone TM For Everywhere You Go", Mar. 2, 1987.

*Primary Examiner*—Curtis Kuntz
*Assistant Examiner*—Dwayne D. Bost
*Attorney, Agent, or Firm*—Kane, Dalsimer, Sullivan, Kurucz, Levy, Eisele and Richard

[57] ABSTRACT

A cellular telephone having wrap-around control keys which extend beyond the front surface of the telephone to its sides, an extended add-on microphone adapter which extends the microphone so it is positioned closer to the user's mouth and a non-slip or soft textured surface on the telephone to provide a more secure grasping thereof.

14 Claims, 3 Drawing Sheets

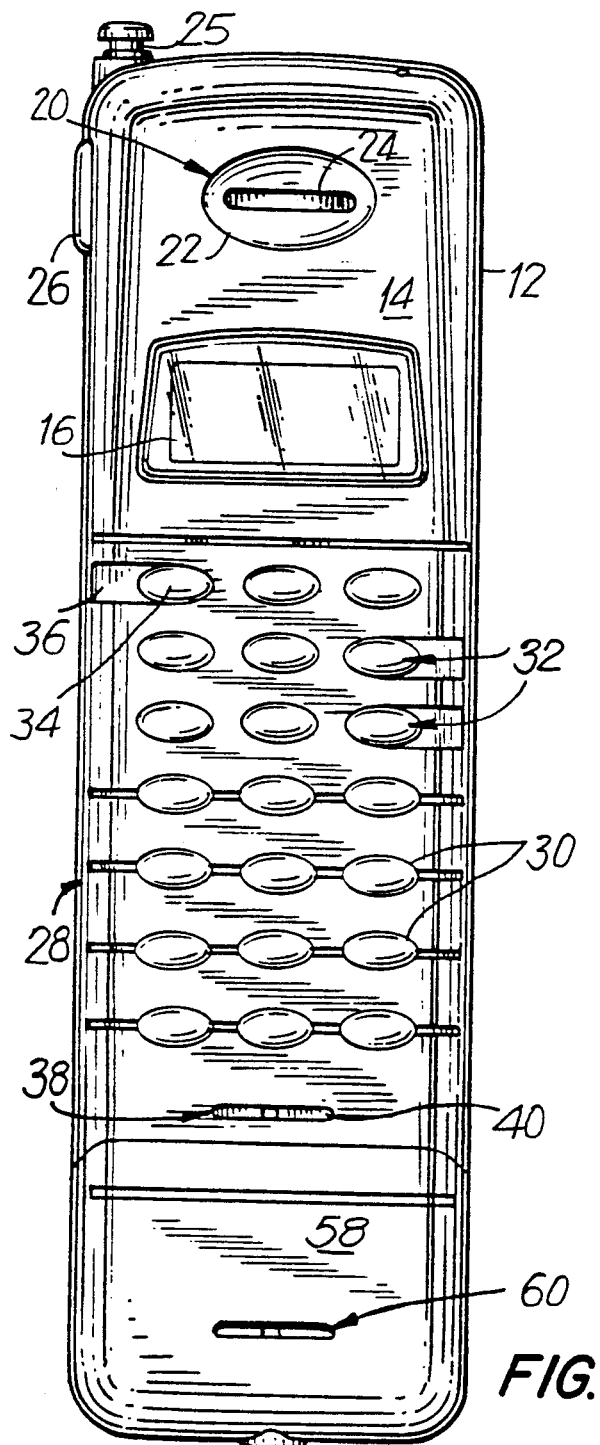
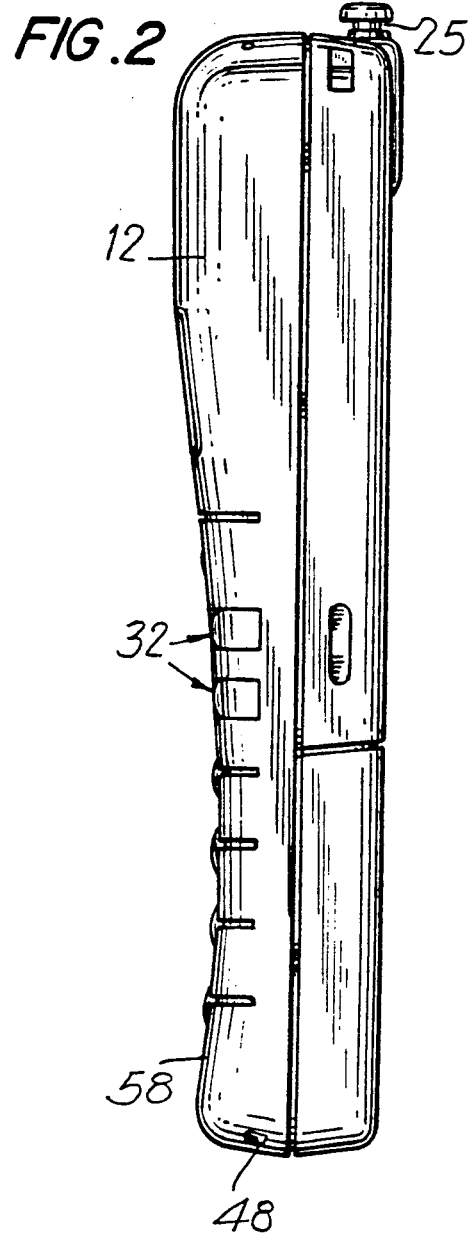

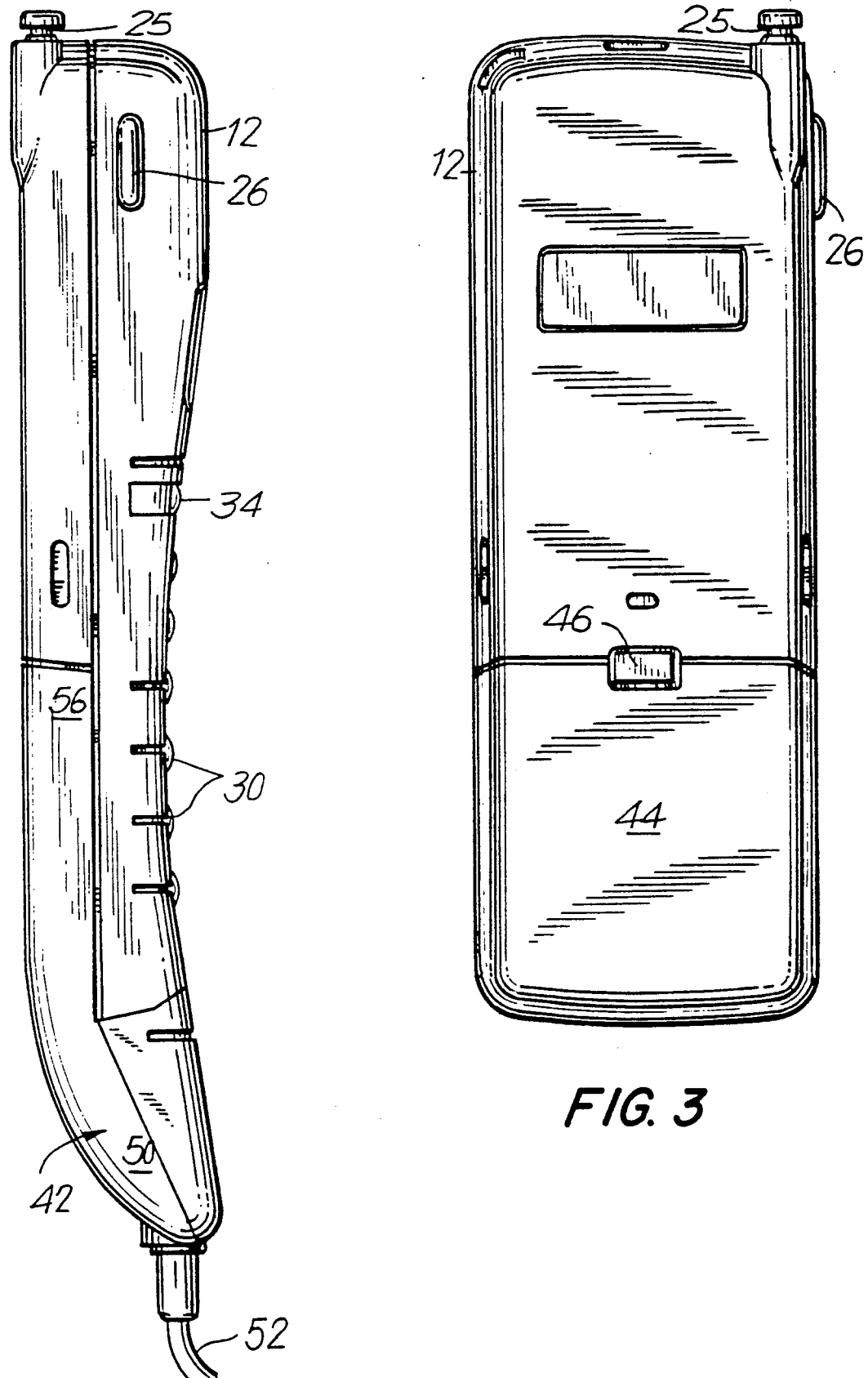

CELLULAR TELEPHONE WITH MICROPHONE EXTENDER

This is a continuation of copending application Ser. No. 07/661,388 filed on Feb. 26, 1991.

FIELD OF INVENTION

The present invention relates to a cellular telephone, in particular, a portable cellular telephone having its own power source and alternatively a separate power source.

BACKGROUND OF THE INVENTION

There presently exists a popular desire for cellular telephones. Such telephones in their initial construction were very bulky and included bulky power packs. However newer cellular telephones have taken on a smaller more streamlined look. Through the use of more sophisticated electronics, hand held units presently exist in which the cellular unit is entirely contained in the telephone. Such units have become pocket size and are readily carried in one's pocket. An accessory feature of these units is an adapter for use in coupling the telephone to an alternate source of power, typically through a cigarette lighter in an automobile or boat.

Depending upon the surroundings in which the cellular telephone is used, often times background noise can be a problem. Such noise is not only annoying but disruptive of the conversation.

In addition, the user may often be occupied with the circumstances of use, for example, driving an automobile while using the telephone. As a result, the user may be constrained from focusing his entire attention on receiving or sending a telephone call. Since existing cellular telephones have keys for various functions, unless the user actually looks at the telephone, the appropriate key or keys may not be activated to perform the desired function. Accordingly, there exists a need to facilitate the user's operation of the telephone while allowing the user to concentrate on other matters such as driving.

In addition, due to the small size of the telephone, the fact that it must often be removed from a holder, and the fact that it may be used while an operator is driving a vehicle, it is desirable that the telephone provides for positive handling thereof by the user. Existing high luster telephones with smooth, almost polished, surfaces do not provide for such positive handling.

SUMMARY OF THE INVENTION

It is therefore a principal object of the invention to provide a cellular telephone which is compact yet designed to facilitate operation.

It is a further object of the invention to provide for a cellular telephone which is adaptable to use various power sources.

It is a still further object of the invention to provide a cellular telephone which obviates the effect of ambient noise associated with different environments such as when one is in an automobile or boat.

It is a yet further object of the invention to provide for a cellular telephone which facilitates key recognition by the user to allow for its use while the user's attention is focused on other matters such as driving.

A yet further object of the invention is to provide for a cellular telephone which allows for positive handling and grasping thereof by the user.

In this regard the present invention is directed towards providing a cellular telephone having several features, those being wrap-around control keys which extend beyond the front surface of the telephone to its sides; an extended add-on microphone adapter which extends the microphone so it is positioned closer to the user's mouth; and a non-slip or soft textured surface. As to the wrap-around keys, the invention provides for certain keys (i.e. power, send and end) to extend beyond the front surface of the telephone to the sides thereof. The wrap-around keys are longer than the other keys and permit the user of the telephone to more easily identify the most important keys at a quick glance or feel.

The extended microphone is adapted to couple with the telephone body and provides a microphone that is positioned closer to the user's mouth then the microphone provided in the body of the telephone. This allows the microphone to pick up the user's voice better and thus avoid significant background noise. The telephone is also provided with a non-slip or soft textured surface which allow a firmer more positive grasping thereof by the user.

BRIEF DESCRIPTION OF THE DRAWINGS

Thus by the present invention its objects and advantages will be realized, the description of which should be taken in conjunction with the drawings wherein:

FIG. 2, is a side view of a cellular telephone, incorporating the teachings of the present invention;

FIG. 3, is a rear view of a cellular telephone, incorporating the teachings of the present invention;

FIG. 4, is a side view of a cellular telephone having its battery pack replaced by an extended add-on microphone power source adapter, incorporating the teachings of the present invention; and FIG. 5, is a frontal view of a cellular telephone shown in FIG. 4.

DETAILED DESCRIPTION OF THE PREFERRED EMBODIMENT

Figure 1:
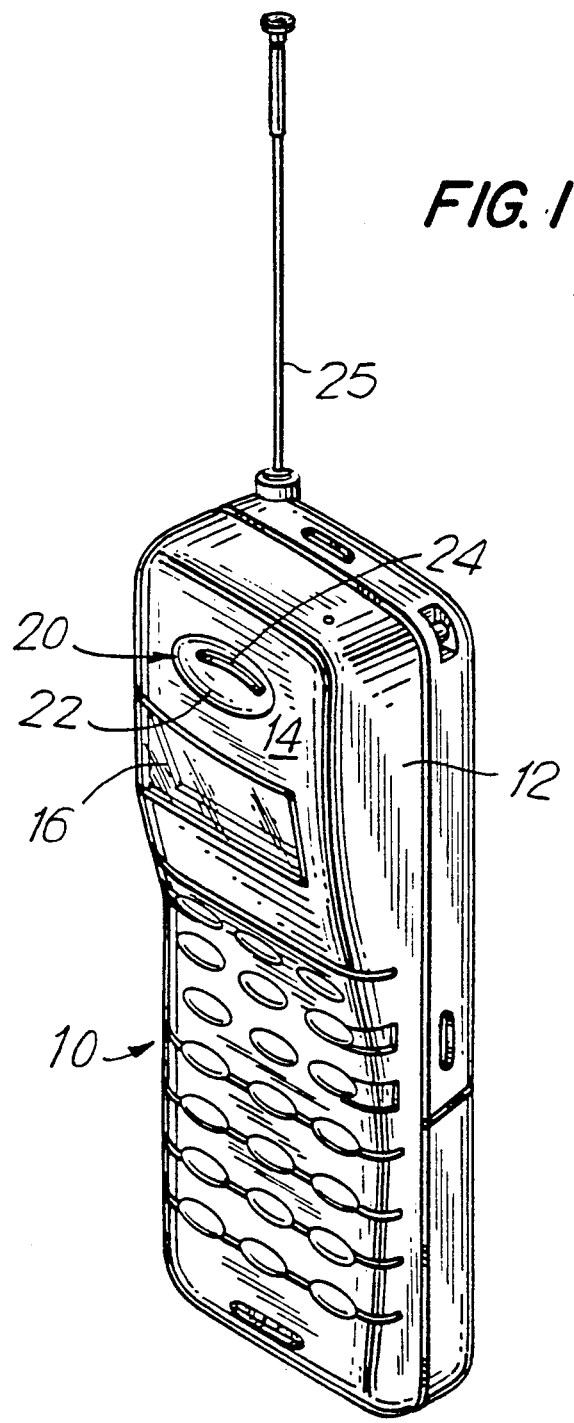
FIG. 1, is an isometric view of a cellular telephone, incorporating the teachings of the present invention.

Turning now more particularly to the drawings, there is shown a hand held portable cellular telephone 10. The telephone 10 is relatively compact in nature and in this regard is approximately 6½ inches (16.51 cm) in length. Such a telephone is manufactured by Mitsubishi International Corporation under model number 3000 (including part number 3000 CLA).

The telephone 10 includes all the electronics (internal) which allow the transmission and receipt of telephone signals in a cellular network. Such electronics are contained within the body 12 of the telephone 10. The body 12 is rectangular in shape and comprises a raised upper portion 14 on which is located a display screen 16 and speaker outlet 20. The display screen 16 displays the various functions of the telephone including number called, etc.

Speaker outlet 20 includes an indented portion 22 which includes a slotted opening 24 behind which a speaker is disposed. This constitutes what is commonly referred to as the earphone portion of the telephone.

At the upper end or top of the telephone, there is provided a flexible retractable antenna 25 for signal transmission and receiving. On the left hand side of the body 12 is positioned a volume button 26, the depression of which will raise or lower the volume depending upon which side is depressed.

Beneath the screen 16, the body 12 tapers to a reduced thickness. Positioned on this tapered portion is a keypad 28. The keypad 28 includes thereon a plurality of oval shaped keys 30 which are slightly raised from the body 12. The keys are made of a white or a translucent material which may be lit during use. Keys 30 correspond to the dialing digits 0-9 as well as other function keys for the telephone 10.

In addition, certain keys 32 are provided with an oval portion 34 and an integral wrap-around portion 36, which enlarges the key and extends it to the sides of the body 12. The wrap-around keys 32 serve to highlight the more important keys such as power, send, end, etc. by sight as well as feel to enable the user to more readily recognize and use such keys.

Positioned at the lower portion of the body 12 is a microphone outlet 38 which includes a slotted opening 40 behind which a microphone is positioned.

Due to the compact nature of the telephone the distance between the earphone portion and the speaker 38 is approximately 5 inches. Accordingly, a user's voice is not picked up directly in front of the mouth but rather to the side of the mouth since the microphone only extends down that far. This has been found to provide acceptable reception under most circumstances of its use. However to enhance such reception an extender adapter 42 is provided, as will be discussed.

On the rear lower portion of the body 12 there is provided a battery pack 44. This battery pack slides into and clips on the body 12 by way of a latching mechanism 46. The battery pack 44 provides a source of power to the telephone and typically is rechargeable. This recharging is facilitated through the use of two contact points 48, one of which is illustrated on the bottom end of the body 12. Typically a recharger is provided with a cradle in which the telephone sits while it is recharged by virtue of the contact points 48 of the telephone making contact with appropriate conductors of the recharger.

Turning now more particularly to the extender adapter 42, this includes a body portion 50 and a cord 52 which terminates in an adapter 54 for coupling with an alternate power source such as a cigarette lighter in an automobile or boat. The extender adapter 42 includes a portion 56 which replaces the battery pack 44 and is clipped in place by way of latch 46. In addition, the shape of the extender adapter 42 allows the user to better and more comfortably grasp the telephone 10. The lower portion 58 of extender adapter 42 cradles the bottom portion of the body 12 and provides a continuous smooth appearance when attached.

Located on portion 58 is a microphone opening 60 which includes a microphone. When coupled to the telephone body 12 the microphone in the extender adapter 42 is activated. The microphone in the body 12 is preferably deactivated at this point. This allows for the activated microphone to be positioned adjacent the user's mouth and provides for increased efficiency in picking up the user's voice and avoiding undesired background noise which might be a problem, in for example, a moving automobile or boat.

The surface of body 12 of the telephone including that of the battery pack 44 and extender adapter 42 is made of plastic having a non-slip soft textured coating which allows for a firmer more secure grasping thereof by the user, as compared to a smooth uncoated plastic housing commonly used in telephones.

Thus by the present invention, its objects and advantages are realized and although a preferred embodiment has been disclosed and described in detail herein, its scope should not be limited thereby, rather its scope should be determined by that of the appended claims.

What is claimed is:

1. A cellular telephone comprising:
   a substantially rectangular body including a front, back and opposite side portions;
   key pad means comprising a plurality of individual keys moveable with respect to the body disposed on the front portion thereof and within a plane defined by said front portion; and
   at least one key having a portion located within the plane defined by said front portion and having a wrap-around portion extending into a plane defined by one of said side portions.

2. The invention in accordance with claim 1 wherein said keys are made of a translucent material.

3. The invention in accordance with claim 1 wherein at least three keys include a wrap-around portion.

4. The invention in accordance with claim 3 wherein at least two of said keys have wrap-around portions which extend into opposite side portions.

5. The invention in accordance with claim 4 wherein said body includes an earphone located at one end of the body and a microphone located at the opposite, an extender means detachably coupled to the body which includes a microphone, and wherein when the extender means is coupled with the body, the microphone in the extender means is activated and the microphone in the body is deactivated with the extender means positioning its microphone in a closer proximity to a user's mouth than that of the microphone in the body.

6. The invention in accordance with claim 5 wherein said extender means includes adapter means for coupling said telephone to a power source.

7. The invention in accordance with claim 6 wherein said body comprises a non-slip soft textured surface which allows for a secure grasping of the telephone.

8. The invention in accordance with claim 1 wherein said body includes an earphone located at one end of the body and a microphone located at the opposite end, an extender means detachably coupled to the body which includes a microphone, and wherein when the extender means is coupled with the body, the microphone in the extender means is activated with the microphone in the body is deactivated with the extender means positioning its microphone in closer proximity to a user's mouth then that of the microphone in the body.

9. The invention in accordance with claim 8 wherein said extender means includes adapter means for coupling said telephone to a power source.

10. The invention in accordance with claim 1 wherein said body comprises a non-slip soft textured surface which allows for a secure grasping of the telephone.

11. The invention in accordance with claim 1 which further includes an extender means detachably coupled to the body so as to extend the length of the telephone to provide a more balanced and comfortable handling thereof by a user, and said extender means includes a microphone which is in close proximity to a user's mouth during use.

12. A cellular telephone comprising a body having a substantially rectangular shape, said body includes an earphone located at one end of the body and a microphone located at the opposite end, an extender means detachably coupled to the body which includes a microphone, and wherein when the extender means is coupled with the body, the microphone in the extender means is activated with the microphone in the body deactivated with the extender means positioning its microphone in closer proximity to a user's mouth than that of the microphone in the body.

13. The invention in accordance with claim 12 wherein said extender means includes adapter means for coupling said telephone to a power source.

14. A cellular telephone comprising a body having a substantially rectangular shape of a defined length with a keypad, earphone and microphone, an extruder means detachably coupled to the body so as to extend the length of the telephone to provide a more balanced and comfortable handling thereof by a user, and said extender means includes a microphone which is in close proximity to a user's mouth during use.

* * * * *